(12) United States Patent
Hick et al.

(10) Patent No.: US 11,273,599 B2
(45) Date of Patent: Mar. 15, 2022

(54) DEVICE FOR MANIPULATING PARTICLES (71) Applicant: AEROSINT SA, Herstal (BE)

(72) Inventors: Matthias Hick, Limbourg (BE); Kevin Eckes, Etterbeek (BE); Colin Guillaume, L'Ecluse (BE); Antoine Deblire, Crisnée (BE); Charles-Edouard Moens De Hase, Waremme (BE)

(73) Assignee: AEROSINT SA, Herstal (BE)

( * ) Notice: Subject to any disclaimer, the term of this patent is extended or adjusted under 35 U.S.C. 154(b) by 0 days.

(21) Appl. No.: 17/041,729

(22) PCT Filed: Mar. 22, 2019

(86) PCT No.: PCT/EP2019/057202
§ 371 (c)(1),
(2) Date: Sep. 25, 2020

(87) PCT Pub. No.: WO2019/185466
PCT Pub. Date: Oct. 3, 2019

(65) Prior Publication Data
US 2021/0114296 A1    Apr. 22, 2021

(30) Foreign Application Priority Data
Mar. 28, 2018 (BE) .............................. BE2018/5209

(51) Int. Cl.
*B29C 64/321* (2017.01)
*B29C 64/205* (2017.01)
(Continued)

(52) U.S. Cl.
CPC ............ *B29C 64/214* (2017.08); *B29C 41/12* (2013.01); *B29C 64/153* (2017.08);
(Continued)

(58) Field of Classification Search
CPC ... B29C 64/205; B29C 64/321; B29C 64/336; B29C 64/165; B29C 64/153; B29C 64/00–393
See application file for complete search history.

(56) References Cited

U.S. PATENT DOCUMENTS

2004/0084814 A1  5/2004  Boyd et al.
2007/0126157 A1  6/2007  Bredt
(Continued)

FOREIGN PATENT DOCUMENTS

WO    2016176432 A1    11/2016
WO    2018059833 A1    4/2018

OTHER PUBLICATIONS

International Search Report dated May 21, 2019, issued in corresponding International Application No. PCT/EP2019/057202, filed Mar. 22, 2019, 7 pages.
(Continued)

*Primary Examiner* — Mary Lynn F Theisen
(74) *Attorney, Agent, or Firm* — Christensen O'Connor Johnson Kindness PLLC (57) ABSTRACT

A device for manipulating particles includes a rotating screen on which a particle structure can be formed and at least one scraper. At least one support element supports the screen at the scraper. The device further includes a particle reservoir and a blower, which is located inside the screen and under the reservoir and which blows a gas in order to fluidize the particles present in the reservoir.

15 Claims, 5 Drawing Sheets

(51) Int. Cl.
*B33Y 30/00* (2015.01)
*B33Y 40/00* (2020.01)
*B29C 64/153* (2017.01)
*B29C 64/214* (2017.01)
*B29C 64/364* (2017.01)
*B29C 41/12* (2006.01)

(52) U.S. Cl.
CPC .......... *B29C 64/205* (2017.08); *B29C 64/321* (2017.08); *B29C 64/364* (2017.08); *B33Y 30/00* (2014.12); *B33Y 40/00* (2014.12)

(56) References Cited

U.S. PATENT DOCUMENTS

| | | |
|---|---|---|
| 2015/0266241 A1 | 9/2015 | Batchelder |
| 2017/0015063 A1* | 1/2017 | Hanyu .................... B29C 64/40 |
| 2019/0022937 A1* | 1/2019 | Stelter .................. B29C 64/141 |
| 2019/0240902 A1 | 8/2019 | Bedoret et al. |

OTHER PUBLICATIONS

Written Opinion of the International Searching Authority dated May 21, 2019, issued in corresponding International Application No. PCT/EP2019/057202, filed Mar. 22, 2019, 6 pages.

International Preliminary Report on Patentability dated Sep. 29, 2020, issued in corresponding International Application No. PCT/EP2019/057202, filed Mar. 22, 2019, 1 page.

* cited by examiner

DEVICE FOR MANIPULATING PARTICLES

TECHNICAL FIELD

The present invention relates to a device for manipulating particles. More specifically, the present invention relates to a device for manipulating particles that can be used in 3D printing.

BACKGROUND

It is known to deposit a particle structure on a moving surface in order to manipulate these particles.

One problem is that the structure on the moving surface may be irregular in time and/or space.

The document US2007/126157 A1 discloses methods and a device for removing finished articles from a powder-based rapid prototyping system. The document US2004/084814 A1 describes a system for making three-dimensional objects with a device for removing the unbound powder. The document US2015/266241 A1 describes an additive manufacturing system comprising a planarization device configured to perform solvent-assisted planarizations on intermediate construction surfaces of the three-dimensional part.

SUMMARY OF THE INVENTION

One of the purposes of the invention is to provide a device for manipulating particles in order to obtain a particle structure present on a particularly regular moving surface. To this end, according to a first aspect, the invention provides a device for manipulating particles and comprising:
  a screen having a first surface on which a particle structure can form, the first surface being arranged to be moved so as to move the particle structure in a direction parallel to the tangent to the first surface,
  a first scraper located on a first side of the screen at a non-zero distance from the first surface and arranged to scrape the particle structure on a first part of the screen, and
  a first support element located on a second side of the screen and arranged to support the first part of the screen, the second side of the screen and the first side of the screen being separated by the screen.

The first scraper is used to scrape the particles on the screen to obtain a structure with a particularly constant thickness in time and space. The first support element, which is preferred but not necessary in the present invention, ensures that the pressure exerted by the first scraper does not deform the screen.

Furthermore, if there is an overall deformation of the screen, for example due to a depression inside the screen, it is particularly interesting to avoid this deformation on the part of the screen where the scraping takes place, because it is there that the thickness of the particle structure is determined. Supporting the first part of the screen thus prevents the influence of parasitic phenomena on the thickness of the particle structure.

The first support element improves, among other things, the uniform thickness across the width of the screen. This is because the screen is typically held laterally by a reinforcing structure which allows it to be stretched, and therefore has a greater tendency to deform towards the middle than at its edges, with the result that, without the first support element, the particle structure tends to be thicker in the middle.

The first support element allows the first surface of the screen to be essentially parallel to the first scraper on the first part of the screen.

The first support element is arranged to tension the first part of the screen. The primary function of the first support element is to locally tension the screen. The first support element exerts pressure on the screen. Preferably, this pressure has a horizontal component.

The first part of the screen is preferably the part of the screen on which the particles are located when they are scraped by the first scraper. It generally extends from one side of the screen to the other. If the screen is cylindrical, the first part of the screen may, for example, be at an angle of less than 5 degrees, preferably less than 2 degrees.

Preferably, the first scraper comprises a scraping part which is a part of the first scraper intended to be in contact with the particles. In particular, the scraping part may comprise a scraping line, which is preferably a line where the first scraper imposes the thickness of the particle structure, and which is preferably straight and essentially perpendicular to the direction of movement of the first part of the screen. It is generally the line of the first scraper that is closest to the first surface.

Preferably there is a plane, called the first plane, which comprises the scraping line and which is perpendicular to the first surface at the level of the first scraper. The first support element is arranged to support the screen in the first plane.

Preferably, the first support element comprises a contact part which is in mechanical contact with the screen. Preferably the contact part comprises a contact line which is in mechanical contact with the screen and which is perpendicular to the direction of movement of the particle structure on the first part of the screen.

The first surface is preferably convex at the first scraper. The second surface is preferably concave at the level of the first support element.

The first scraper is preferably located at a non-zero distance from the first surface, this distance determining the thickness of the particle structure remaining on the first surface after scraping. This distance can be checked, for example, by means of a gauge between the screen and the first scraper.

The first scraper may, for example, comprise a blade, roller or other device. If there is a blade, it should preferably be inclined in relation to the first plane. The first scraper preferably extends from one side of the screen to the other at the level of the first part of the screen. In other words, it preferably extends over the entire width of the screen at the first part of the screen.

Preferably, in the particle structure formed on the first surface of the screen, the particles are not chemically bonded together. The particle structure is preferably a particle layer. Preferably, the particles are electrically neutral, i.e. free of electrical charge.

For the purpose of this document, a screen is a porous medium (e.g. the screen may comprise through-holes through which a gas can pass). Preferably, the first surface is impenetrable to the particles (i.e., the particles are trapped against the first surface and do not penetrate the screen). The device is preferably designed so that at least 90% of the second surface of the screen is permanently free of blockage. This allows the holes to be cleared over a large part of the second surface of the screen.

The screen preferably comprises a sheet of material. Preferably, the screen is flexible but is stretched sideways.

The screen forms a means for transporting particle since the first surface moves the particle structure in a direction parallel to its tangent.

The movement of the first surface allows the particle structure to move forward, preferably in a direction locally parallel to the first surface. Preferably, the second surface moves at the same time as the first surface. This movement is preferably a rotation.

Preferably, the screen has a convex surface, for example a cylinder, at least partially delimiting an inner space. Preferably, the inner space corresponds to the second side of the screen.

Preferably, the screen has a cross-section which is a curve h, so as to form a conveyor belt for a method for continuous manipulating. For example, the screen may be cylindrical. Its axis of rotation is then preferably in the foreground. This closed curve also allows the interior volume of the screen to be put under vacuum by a suction device so that the particles are held on the first surface.

The particle structure is preferably continuous on the first part of the screen. Indeed, it is preferred that a continuous structure is formed upstream of the scraper, and that, if necessary, parts of this structure are removed downstream of the scraper.

The device preferably comprises a feed element arranged to feed particles to the first surface.

The first surface is typically an outer surface of the screen and the second surface is typically an inner surface of the screen.

In one embodiment, the first support element is located directly opposite the first scraper in relation to the screen, in particular in relation to the first part of the screen.

For example, the contact line can be in the foreground. This allows particularly effective mechanical support. It is also possible, while remaining within the scope of the invention, for the first support element to comprise two parts located on either side of the foreground but arranged to support the first part of the screen in the foreground.

Preferably, the first support element is always located directly opposite the first scraper with respect to the screen. For example, if the first scraper is fixed, the first support element is also fixed; and if the first scraper moves, the first support element simultaneously moves across the screen so as to remain directly opposite the first scraper with respect to the screen.

In an embodiment, the first support element extends from one side of the screen to the other at the first part of the screen. In other words, it preferably extends over the entire width of the screen at the level of the first part of the screen.

In an embodiment, the first scraper comprises a scraping part intended to be in contact with the particles, the device being arranged so that the scraping part can be moved in a direction opposite to the direction of movement of the particle structure on the first part of the screen.

This allows the particles that do not pass between the first surface and the first scraper to be lifted. This makes the particle powder more fluid, allowing it to spread more easily as it forms fewer agglomerates that are difficult to break up. This movement of the scraping part is particularly easy when the first scraper is cylindrical, in which case it is rotated, but can be considered with other forms of first scraper.

Preferably, the device according to the invention comprises a motor for moving the first scraper, so as to obtain this movement of the scraping part.

In an embodiment, the first scraper is a cylinder. Preferably, the axis of this cylinder is parallel to the scraping line. Preferably, the axis of this cylinder is in the first plane. A cylinder is better at spreading the powder than a blade.

In an embodiment, the first support element comprises a support cylinder. Preferably, the axis of this cylinder is parallel to the contact line.

In an embodiment, the support cylinder is arranged to be rotated by the screen.

In an embodiment, the device further comprises a suction device arranged to hold the particles on the first surface. The particles are held on the first surface during at least a part of the movement of the first surface. In particular, the particles are preferentially held on the first surface during the scraping by the first scraper.

The suction device preferably generates an under pressure on the second surface side of the screen with respect to the pressure on the first surface side of the screen over at least a part of the screen. Preferably, the interior volume of the screen is closed off laterally so as to prevent a passage of gas at the lateral ends. Preferably, the suction device is at least partially located on the second side of the screen.

In an embodiment, the device furthermore comprises
a second scraper located on the first side of the screen and arranged to scrape the particle structure on a second part of the screen, and
a second support element located on the second side of the screen and arranged to support the second part of the screen.

The second part of the screen is different from the first part of the screen.

Preferably, the second support element has the same characteristics and arrangement as the first support element. Preferably, the second scraper has the same characteristics and arrangement as the first scraper.

If the device includes two scrapers, the feed element is preferably arranged to feed the first surface between the two scrapers. The reservoir is preferably located between the two scrapers and can be partially delimited by them.

The presence of two scrapers and two support elements makes it possible to reverse the direction of rotation of the screen while maintaining the scraping and support effect.

The device according to the invention is preferably symmetrical in a vertical plane passing through its axis of rotation.

In an embodiment, the device comprises a blower arranged to blow or expel a gas through the screen into a particle reservoir.

For the purposes of this document, a blower is any device capable of generating a flow of gas, preferably by ejection.

The flow of gas generated by the blower, passing through the screen, sets the particles in the reservoir in motion. In this way, the blower makes the particle powder in the reservoir more fluid. This prevents, for example, the formation of bridges that prevent the particles from flowing freely. It also makes scraping easier and more efficient.

Preferably, the reservoir is at least partially delimited by the first scraper. The reservoir can also be partially delimited by a part of the first surface, by the second scraper and/or by the walls designed to retain the particles.

The reservoir is a part of the device in which the particles are provided, preferably by a feed element. They are stored in the reservoir. The reservoir is typically upstream of the scraper. The feed element can be part of the reservoir.

The reservoir is located on the first side of the screen. The reservoir is preferably located above the screen.

In an embodiment, a wall of the reservoir is at least partially formed by a part of the screen, in particular by a part of the first surface of the screen.

In an embodiment, the blower comprises a purge nozzle on the second side of the screen.

The purge nozzle allows gas to be blown through the screen.

In an embodiment, the blower comprises a first zone located on the second side of the screen that is over pressurized relative to the reservoir. The pressure difference between the first zone and the reservoir generates a blow through the screen from the first zone to the reservoir.

In an embodiment, the device comprises an ejection device arranged to eject the particles from the first surface, preferably in such a way as to repel the particles from the screen.

The ejection device may, for example, blow gas or send a sound wave towards the screen, which passes through the screen and carries away particles. Preferably, the ejection device blows the gas, or sends the sound wave, perpendicular to the surface of the screen. The ejection device is preferably arranged to eject the particles downwards or in any other direction (e.g. horizontal) from the first surface of the screen.

In an embodiment, the ejection device is located on the second side of the screen and is arranged to generate a transport fluid flow which only passes through predetermined parts of the first surface of the screen.

For example, the ejection device may comprise a series of ejection orifices, each orifice ejecting an element of the transport fluid flow, which is preferably perpendicular to the first part of the screen. Preferably it is possible to control which orifices eject from the transport fluid flow, for example by means of a valve system. The orifices are preferably arranged in a staggered arrangement.

The invention furthermore relates to a three-dimensional printing system comprising at least once the device according to one of the embodiments of the invention, and a means of agglomeration.

Preferably, the system comprises means for moving the screen with respect to a structure of three-dimensional printing.

The three-dimensional printing is one of the possible applications of the device according to the invention. It may, for example, be used in the system described in the international patent application PCT/EP2017/071039. It can also be used, for example, in a powder bed system, in particular an additive powder bed manufacturing system, such as in an SLS (Selective Laser Sintering) system where the device can be used as a recoater. In such a system, the function of the device according to the invention may be to deposit a layer of powder on the structure being printed. It is also possible to use it in a screen-printing method. In screen-printing, it makes it possible, in particular, to print digital images; to manipulate powders (dry inks); and to print reliefs on different substrates for any type of application.

The means of agglomeration allows at least a part of the deposited particles to adhere, for example by ejection, to a three-dimensional printing structure so that the particles are integrated into the three-dimensional printing structure. For the purposes of this document, particle agglomeration is a fixation of the particles together. An agglomeration is preferentially selective in that inert particles are not agglomerated. An agglomeration may comprise at least one of the following methods: heat treatment, sintering, melting, glue application, binder application, or ultrasonic welding. For example, the means of agglomeration may comprise at least one of the following: a furnace, a laser, an electron beam, a laser equipped with a scanning system to be able to heat the entire stratum, a halogen lamp, inductive heating, microwave heating, an ion beam, a local or uniform chemical reaction. The agglomeration can be achieved uniformly line by line by scanning in one direction with a beam heating the material along a line.

The invention further relates to a method for manipulating particles comprising the steps of:
 providing a device according to one of the embodiments of the invention,
 supplying particles on the first surface,
 moving the particles to the first part of the screen, and
 scraping the particles.

The supply of particles to the first surface precedes the scraping. In other words, the particles are supplied to the first surface and then moved to the first part of the screen where they are scraped.

The invention further relates to a three-dimensional printing method comprising, in this order:
 the method for manipulating particles described above,
 an ejection of the particles from at least parts of the particle structure, and
 an agglomeration of said particles.

For example, the particles are supplied to the first surface, then scraped by the first scraper, and some are ejected by the ejection device. This ejection deposits them on a first substrate or three-dimensional printing structure where they are agglomerated by means of agglomeration.

A second aspect of the invention is that it provides a device for manipulating particles and comprising:
 a screen having a first surface on which a particle structure can be formed, the first surface being arranged to be moved,
 a particle reservoir and
 a blower arranged to blow a gas through the screen into the reservoir.

The movement of fluid generated by the blower through the screen moves the particles in the reservoir. In this way, the blower is used to fluidize the particle powder in the reservoir. This fluidification allows the particles to spread out better and not form packs. This results in a more regular particle structure.

Preferably, the blower should be located below the reservoir, so that the screen prevents the particles from falling into the blower.

The blower may be combined with one or more of the elements shown in this document, in particular the first and/or second scraper, the first and/or second support element, the suction device, the ejection device and/or the means of agglomeration, regardless of the arrangement of said element(s).

According to different embodiments, which may be taken together or separately:
 The device comprises a first scraper located on a first side of the screen and arranged to scrape the particle structure on a first part of the screen.
 The device comprises a suction device arranged to hold the particles on the first surface.
 The device comprises an ejection device arranged to eject the particles from the first surface.
 The ejection device is located on the second side of the screen and is arranged to generate a transport fluid flow which passes through only predetermined parts of the first surface of the screen.
 A wall of the reservoir is at least partially formed by a part of the screen.
 The blower comprises a purge nozzle located opposite the reservoir with respect to the screen. In other words, the purge nozzle is on the second side of the screen. The purge nozzle allows gas to be blown through the screen.

The blower has a first zone located opposite the reservoir with respect to the screen and at an overpressure with respect to the reservoir. In other words, the first zone is on the second side of the screen.

The invention further provides a three-dimensional printing system comprising at least once the device in accordance with an embodiment of the invention, and a means of agglomeration.

The invention further provides a method for manipulating particles comprising the steps of:
providing a device according to one of the embodiments of the invention,
supplying particles to the reservoir,
blowing a gas through the screen into the particles in the reservoir.

BRIEF DESCRIPTION OF THE FIGURES

Other characteristics and advantages of the invention will appear when reading the following detailed description, for the understanding of which reference is made to the figures annexed hereto, among which are.

EMBODIMENTS OF THE INVENTION

The present invention is described with particular embodiments and references to figures, but the invention is not limited by them. The drawings or figures described are only schematic and are not limiting.

For the purpose of this document, the terms "first" and "second" serve only to differentiate between the different elements and do not imply any order between these elements.

In figures, the identical or similar elements may bear the same references.

Although the particles are represented as spherical, the present invention may refer to particles of any shape. In addition, the size of the particles and of the particle structure is generally exaggerated in the figures.

According to a first aspect of the invention, the device comprises a first scraper and a first support element. The first scraper and the first support element are illustrated in FIGS. 1, 2, 3 and 4. According to a second aspect of the invention, the device comprises a reservoir and a blower. The reservoir and the blower are illustrated in FIGS. 2, 3, 5 and 6. The elements illustrated in all the figures of this document are compatible with both aspects of the invention. In addition, a feature presented in an embodiment of one of the two aspects may be present in an embodiment of the other of the two aspects of the invention.

Figure 1:
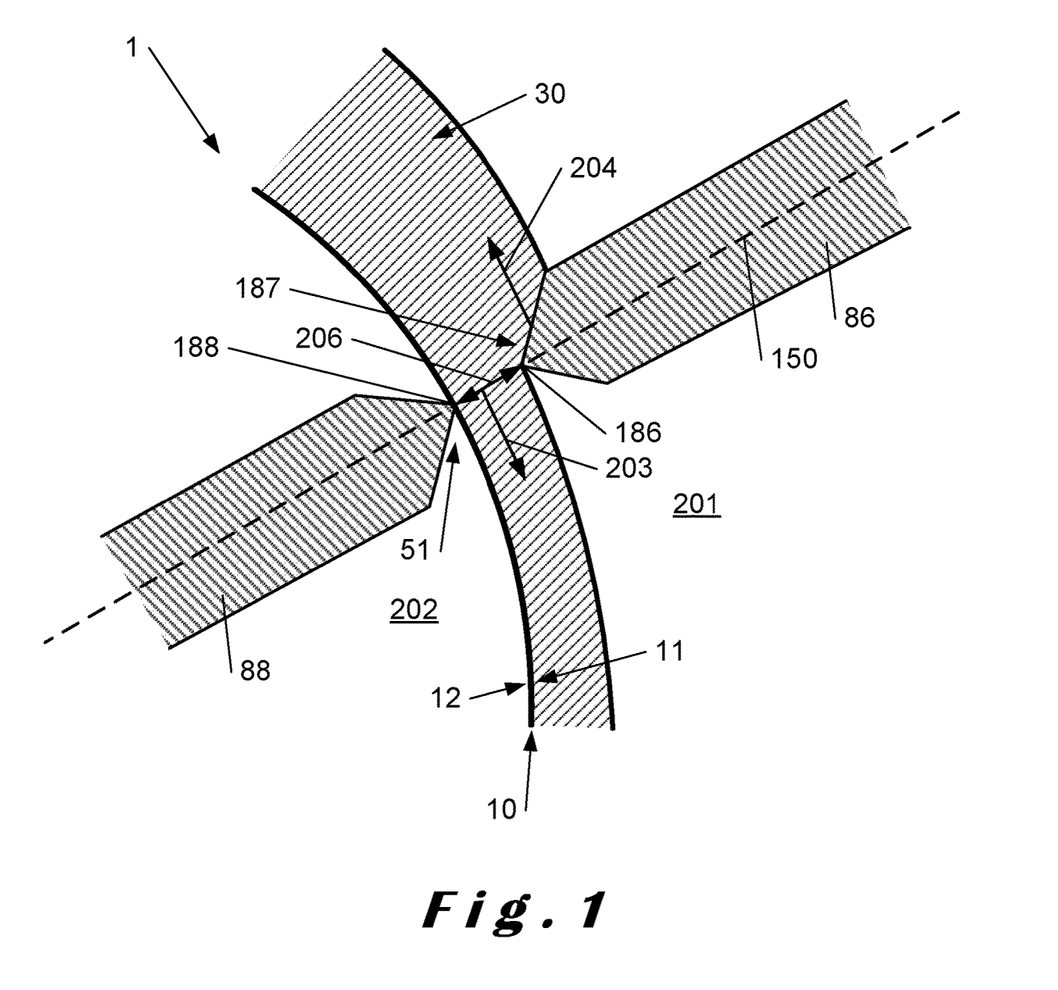
FIG. 1 illustrates a sectional view of a part of a device for manipulating particles according to an embodiment of the invention.

FIG. 1 shows a sectional view of a part of a device 1 for manipulating particles according to an embodiment of the invention. The device 10 comprises a screen 10, a first scraper 86 and a first support element 88.

The screen 10 has a first surface 11 located on a first side 201 of the screen 10 and a second surface 12, opposite to the first surface 11 and located on a second side 202 of the screen 10 opposite to the first side 202. The screen 10 can be arranged to move. In particular, it may be arranged to rotate, for example, according to a closed curve of any shape.

The first side 202 is preferably under-pressurized with respect to the first side 201, by suction device, so that the particles are held on the surface of screen 10 by suction.

A particle structure 30 may form on the first surface 11. It moves with the first surface 11. It generally moves in a direction that is parallel to the tangent to the first surface 11. This direction is illustrated by the arrow 203 at the first scraper 86. The particle structure 30 is scraped by the first scraper 86, so it is generally thicker upstream of the first scraper 86 than downstream of it. The part of the screen 10 on which the scraping is carried out can be called the first part 51 of the screen. It is preferably essentially a straight line tangential to the first surface 11 and perpendicular to the direction 203 of the movement of the structure 30.

The first scraper 86 is located on the first side 201 of the screen 10, at a distance 206 from the screen. The first scraper 86 comprises a scraping part 187 which is designed to be in contact with the particles. It can also be referred to as the first scraping part. Preferably, the scraping part 187 comprises a scraping line 186, perpendicular to the plane of FIG. 1.

The first support element 88 is located on the second side 202 of the screen 10, preferably directly opposite the first scraper 86.

In general, there is a plane, called the first plane 150, which comprises the scraping line 186 and is perpendicular to the first surface 11 at the level of the first scraper 86.

Preferably, the first support element 88 comprises a contact part 188 which is in mechanical contact with the screen 10, in particular with the second surface 12. This contact part can for example be a line parallel to the scraping line 186. The contact part 188 is preferably at least partially in the first plane 150.

According to an embodiment of the invention, the device 1 is arranged so that the scraping part 187 can be set in motion in a direction 204 opposite to the direction 203 of motion of the particle structure on the first part 51 of the screen 10.

Figure 2:
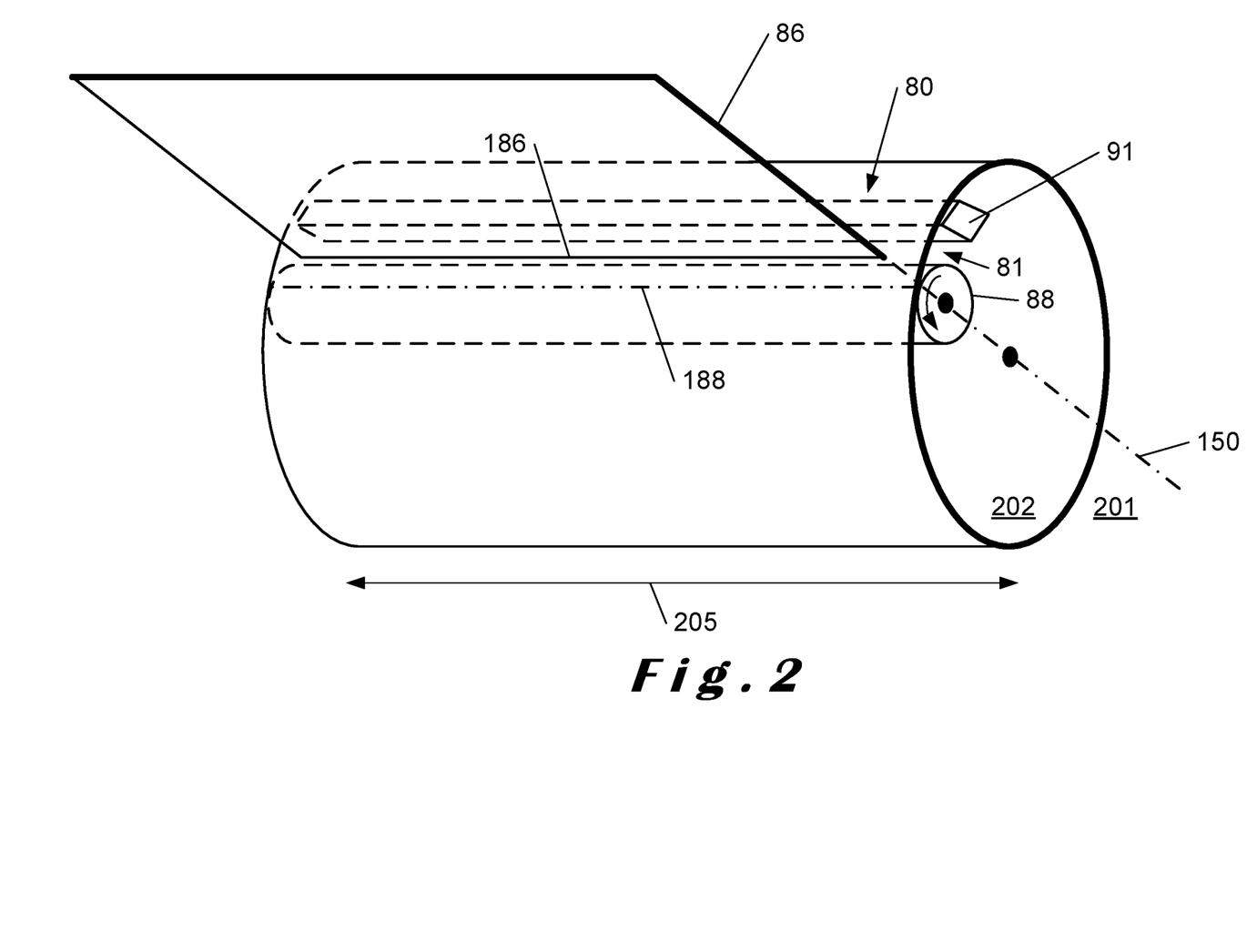
FIG. 2 illustrates a device for manipulating particles according to an embodiment of the invention.

FIG. 2 shows a device 1 for manipulating particles according to an embodiment of the invention.

In the embodiment shown in FIG. 2, the screen 10 is cylindrical and the first support element 88 is a support cylinder. The axis of rotation of the screen and that of the first support element 88 are parallel and in the first plane 150. The rotation of the screen 10 causes the first support element 88 to rotate by contact.

FIG. 2 shows that the device 1 can comprise a particle reservoir 80 with a wall 81 formed by a part of the screen 10. Another wall of the reservoir 80 is formed by the first scraper 86. In addition, the device 1 comprises a blower arranged to blow a gas through the screen 10 into a reservoir 80. The blower may comprise, for example, a purge nozzle 91.

FIG. 2 also shows a width 205 of the screen 10, which is a dimension of the screen perpendicular to its direction of movement 203. It can be seen that the first scraper 86 and the first support element 88 extend from one side of the screen 10 to the other.

Figure 3:
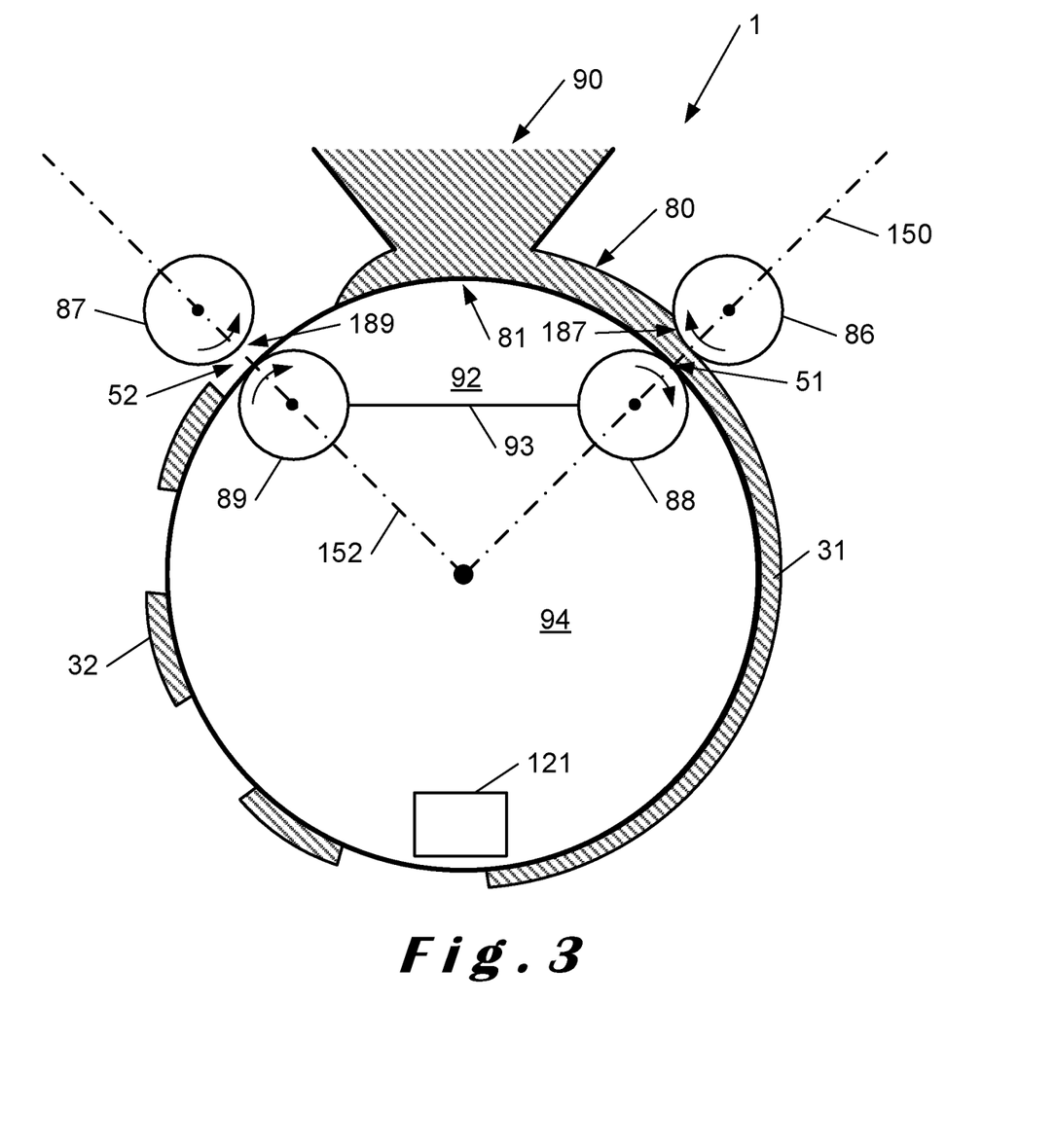
FIG. 3 shows a sectional view of a device for manipulating particles according to an embodiment of the invention.

FIG. 3 shows a sectional view of a device 1 for manipulating particles in a manner embodying the invention. In the embodiment shown in FIG. 3, the screen 10, the first scraper 86 and the first support element 88 are cylindrical. Their axes of rotation are parallel and in the first plane 150.

In the embodiment shown in FIG. 3, the device 1 further comprises a second scraper 87 located on the first side 201 of the screen 10 and arranged to scrape the particle structure 30 from a second part 52 of the screen 10 and a second support element 89 located on the second side 202 of the screen 10 and arranged to support the second part 52 of the screen 10. The second scraper 87 and the second support element 89 are cylindrical, but they could have another shape while remaining within the scope of the present invention. Their axes of rotation are parallel to that of the screen 10 and are in a second plane 152. The second plane 152 is defined with respect to the second scraper 87 as the first plane 150 is defined with respect to the first scraper 86.

A second scraping part 189 is defined with respect to the second scraper 87 as the first scraping part 187 is defined with respect to the first scraper 86.

The second scraper 87 and the second support element 89 are used, in particular, to be able to reverse the direction of rotation of the screen 10 while maintaining the characteristics of the device 1. The second scraper 87 can also be used as a wall for the reservoir 80.

The rotation of the screen 10 causes the first support element 88 and the second support element 89 to rotate by contact.

The first scraper 86 preferably rotates so that the scraping part 187 describes a movement in the opposite direction 204 to the direction 203 of movement of the particle structure on the first part 51 of the screen 10. This rotation is preferably driven by a motor. This rotation allows particles to be returned to the reservoir 80. The device 1 is preferably arranged so that the first scraper 86 can also be rotated in the opposite direction.

The second scraper 87 preferably rotates so that particles are returned to reservoir 80. This rotation is preferably driven by a motor.

In the embodiment illustrated in FIG. 3, the device 1 comprises a blower with a first zone 92 located on the second side 202 of the screen 10 and at an overpressure with respect to the reservoir 80. The blower blows gas through the part of the screen 81 which forms a wall of the reservoir 80. The reservoir 80 is preferably located above the screen 10, so that the particles tend to go to the first surface 11 of the screen 10 due to gravity, despite the blower.

The blower for the device 1 shown in FIG. 3 could comprise the purge nozzle 91 shown in FIG. 2, in addition to the first overpressure area 92.

In the embodiment shown in FIG. 3, the device 1 also comprises a feed element 90. Preferably, the blower also blows into the feed element 90.

The device 1 preferably also comprises a second zone 94, which is at a reduced pressure compared to the pressure on the first side 201 of the screen 10 thanks to a suction device. This reduced pressure keeps the particles on the screen 10. The first 92 and the second 94 zones can be separated by a gas-tight partition wall 93.

In the embodiment illustrated in FIG. 3, the device 1 also comprises an ejection device 121 arranged to eject the particles from the first surface 11 of the screen 10.

For example, the device 1 can operate as follows. The feed element 90 feeds particles into the reservoir 80. The particle structure 30 forms in the reservoir 80 and is driven by the rotation of the screen to form a layer on the first surface 11. On reaching the first scraper 86, the particles are compacted and scraped and some of them remain in the reservoir 80. The particles that continue the movement form a continuous part 31 of the structure 30, i.e. a regular particle layer. On reaching the ejection device 121, some parts of the particle structure 30 are ejected, for example to form a part of a particle stratum. The parts of the particle structure 30 that are not ejected remain on the first surface 11 and form discontinuous parts 32 of the structure 30. These parts pass between the second scraper 87 and the first surface 11 and are reintegrated into the particles in the reservoir 80. The blower is particularly interesting to remove these particles from the first surface 11 so that the structure 30 formed again on these parts of the first surface 11 is as regular as possible and does not keep track of the previous ejections.

Figure 4:
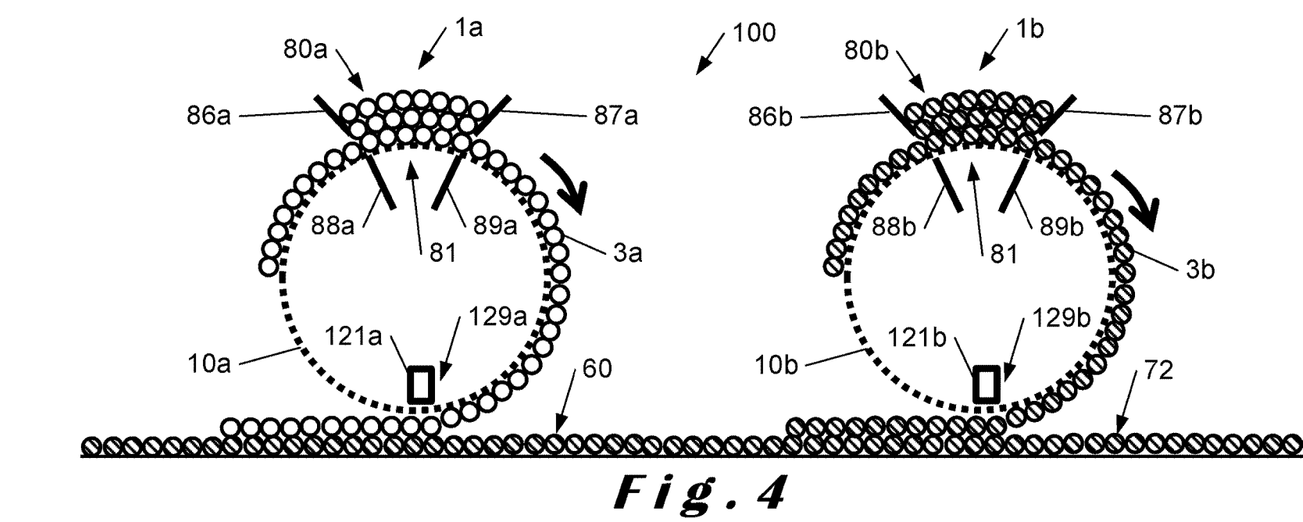
FIG. 4 illustrates a system comprising at least two devices for manipulating particles according to an embodiment of the invention.
Figure 5:
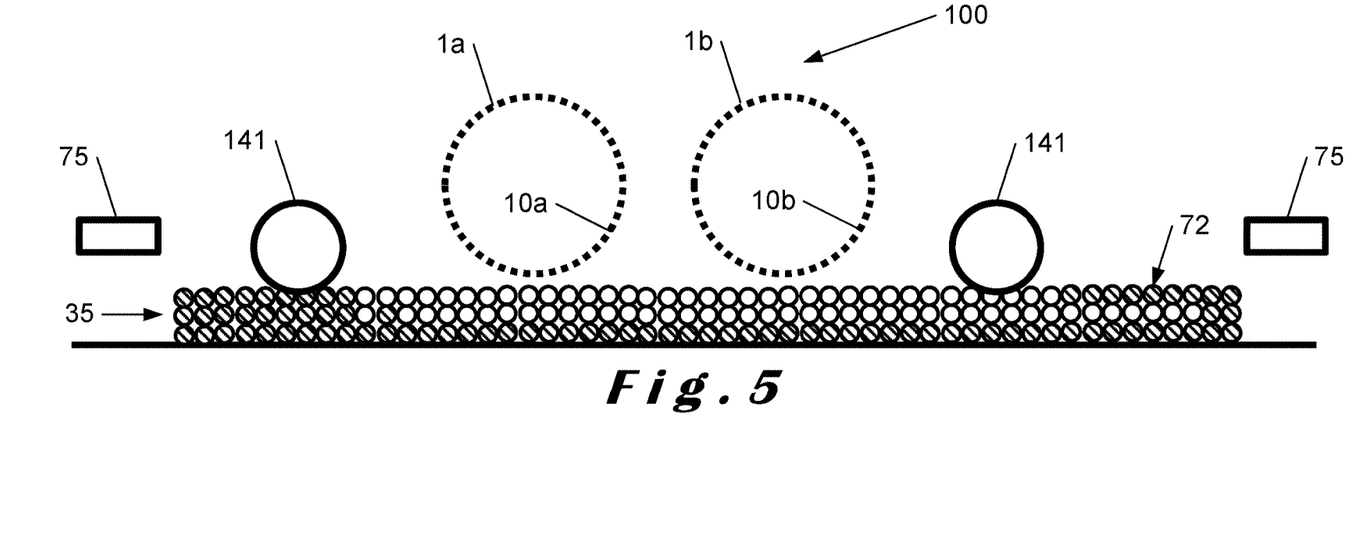
FIG. 5 illustrates a system comprising at least two devices for manipulating particles according to an embodiment of the invention.

FIGS. 4 and 5 illustrate a system 100 comprising at least two devices 1a, 1b for manipulating particles according to an embodiment of the invention. This system can for example be used for a three-dimensional printing. It is possible, while remaining within the scope of the invention, for the system 100 to comprise more than two devices 1 according to the invention. The screens 10a, 10b are arranged parallel to each other, preferably with their axes in the same horizontal plane. In the illustration in FIGS. 4 and 5, the system 100 is printing a three-dimensional printing structure 72 which may comprise particles already agglomerated or not yet agglomerated.

FIG. 4 illustrates that the scrapers 86a, 86b, 87a, 87b can be tilted with respect to the foreground, while the support elements 88a, 88b 89a, 89b are in the foreground.

Preferably, the particles 3a arranged by the first device 1a are particles 3a of a first type, for example capable of being agglomerated by a specific method. Preferably, the particles 3b arranged by the second device 1b are particles 3b of a second type, for example not capable of being agglomerated by this specific method.

Preferably, the screens 10a, 10b rotate with their axis of rotation fixed when a stratum 35 is deposited, and a first substrate 60, which serves as a support for the three-dimensional printing structure 72, advances in one direction or the other. It is also possible, while remaining within the scope of the invention, that the screens 10a, 10b have their axis of rotation moving parallel to the first substrate 60 and that the latter is fixed. It is also possible that the screens 10a, 10b and the first substrate 60 move in a coordinated manner.

The ejection devices 121a, 121b are controlled so as to obtain the desired three-dimensional printing structure 72. Preferably, they are controlled so that the stratum 35 formed by the particles 3a, 3b deposited by the devices 1a, 1b is continuous, i.e. has no holes.

When a particle stratum 35 has been deposited, and before depositing the next stratum 35, the screens 10a, 10b are moved away from the three-dimensional printing structure 72 by a distance preferably equal to the thickness of the stratum 35. This allows the next stratum 35 to be deposited. It is possible for successive stratum 35 to have different thicknesses.

In an embodiment of the invention, the system 100 further comprises at least one compaction roller 141 forming a means of uniforming the height of the powder stratum deposited on the three-dimensional printing structure. Preferably, the system 100 comprises two means of uniformization, each being located on one side of the screens 10a, 10b. In an embodiment of the invention, the system 100 further comprises at least a means of agglomeration 75. Preferably, the system 100 comprises two means of agglomeration 75, each being located on one side of the screens 10a, 10b, further than the means of uniformisation.

The system 100 preferably operates as follows.

A particle bed of the second type 3b, which are not capable of being agglomerated by the method carried out by the means of agglomeration 75, is deposited on the first substrate 60. The particle bed forms the starting three-dimensional printing structure 72.

The reservoir 80a is filled with particles of the first type 3a, which are capable of being agglomerated by the method carried out by the means of agglomeration 75. The reservoir 80b is filled with particles of the second type 3b.

The screens 10a, 10b each rotate about their own axis, which carries away particles from the reservoirs 80a, 80b which are held on the first surfaces by an air suction, e.g. by an external fan connected to the internal volumes of the screens. The air flow rate of the suction is chosen according to the type of powder. The thickness of the particle layer 3a, 3b on the screen 10 is preferably between 50 µm and 1000 µm. This is determined, in particular, by the position of the second scrapers 87a, 87b. The thickness of the stratum 35 may be different from the thickness of the layer on the screen 10. Indeed, the particles of the stratum 35 may spread after deposition. It is also possible to vary the thickness of the stratum 35 by varying the speed of rotation of the screen and/or translation of the three-dimensional printing structure 72.

The screens 10a, 10b move horizontally in a direction perpendicular to their axis, so that they pass through the three-dimensional printing structure 72 while rotating on themselves. Preferably, the speeds of rotation and translation are synchronized so that the relative speed of the nearest point of the screen 10 and the three-dimensional printing structure 72 is zero. This ensures that the particles have no tangential velocity to the screen during transfer, which allows for more accurate deposition. Particles that have not been deposited will flow back to the reservoirs 80a, 80b and can be used later.

Preferably, once the stratum 35 is deposited, it is uniformized by the compaction roller 141 and then agglomerated by the means of agglomeration 75 in order to integrate the three-dimensional printing structure 72. The next stratum 35 is then deposited.

It is possible that the next stratum 35 is deposited on the return path from the stratum that has just been integrated into the three-dimensional printing structure 72. For example, the deposition of strata (as well as compaction and agglomeration) can be done from right to left and from left to right. In this case, it is preferred that the system has two means of uniformisation and two means of agglomeration 75 as shown in FIG. 16.

Figure 6:
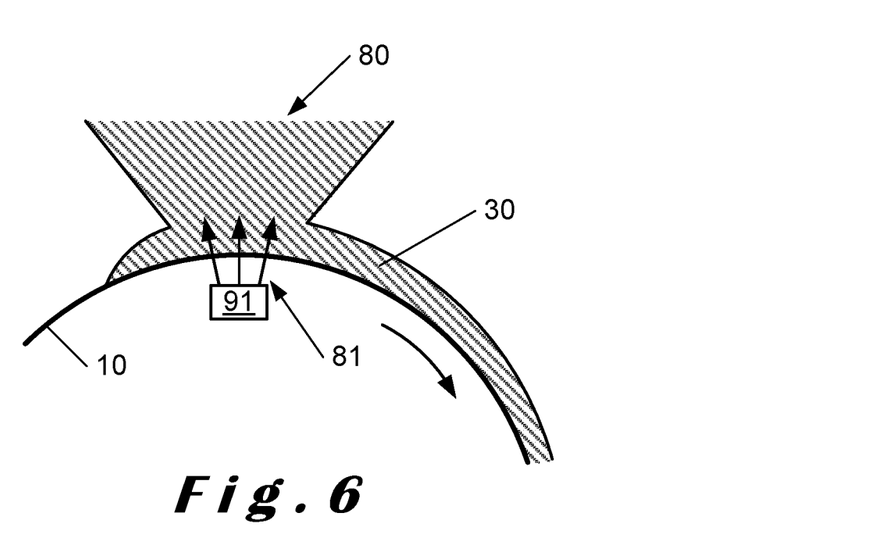
FIG. 6 shows a sectional view of a part of a device for manipulating particles according to an embodiment of the invention.
Figure 7:
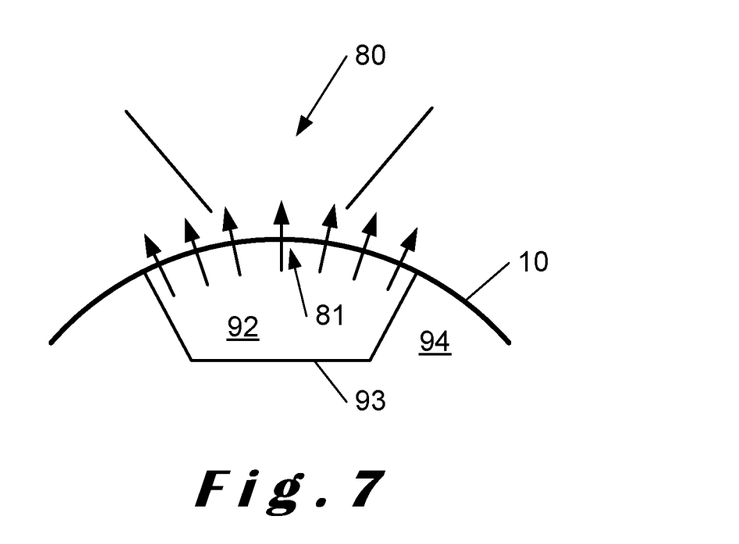
FIG. 7 shows a sectional view of a part of a device for manipulating particles according to an embodiment of the invention.

FIG. 6 shows a sectional view of a part of a device 1 for manipulating particles according to an embodiment of the invention. FIG. 7 shows a sectional view of a part of a device 1 for manipulating particles in an embodiment of the invention. In the second aspect of the invention, the device 1 does not necessarily comprise a scraper, and if it comprises a scraper, it does not necessarily comprise a support element as described herein. The device 1 comprises a screen 10 having a first surface 11 on which a particle structure 30 may be formed. The screen is preferably similar to that described with reference to any of FIGS. 1 to 5. The device 1 also includes a blower arranged to blow a gas through the screen 10 into a particle reservoir 80. The blower may, for example, comprise a purge nozzle 91 located opposite the reservoir 80 with respect to the screen 10, or a first zone 92 located opposite the reservoir 80 with respect to the screen 10 and at an overpressure with respect to the reservoir 80.

In other words, the invention relates to a device 1 for manipulating particles. The device 1 comprises a rotating screen 10 on which a particle structure 30 can be formed. According to a first aspect of the invention, the device 1 comprises at least one scraper 86, 87 and at least one support element 88, 89 supporting the screen 10 at the level of the scraper 86, 87. According to a second aspect of the invention, the device 1 comprises a particle reservoir 80 and a blower, preferably located inside the screen 10 and under the reservoir 80, and blowing a gas to lift the particles present in the reservoir 80.

The various embodiments and aspects of the invention are combinable with the system described in international patent application PCT/EP2017/071039.

The present invention has been described in relation to specific embodiments, which are purely illustrative and should not be considered as limiting. In general, the present invention is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the" to introduce an element does not exclude the presence of a plurality of such elements. The reference numbers in claims shall not limit their scope.

The invention claimed is:

1. A device for manipulating particles comprising:
a screen having a first surface on which a particle structure can form, the first surface being configured to be moved,
a first scraper located on a first side of the screen, at a non-zero distance from the first surface, and configured to scrape the particle structure on a first part of the screen, and
a first support element located on a second side of the screen and arranged to support the first part of the screen, the second side of the screen and the first side of the screen being separated by the screen,
the first surface being configured to be moved so as to move the particle structure in a direction parallel to the tangent to the first surface.

2. The device according to claim 1, further comprising a suction device configured to hold the particles on the first surface.

3. The device according to claim 1, wherein the first support element is configured to tension the first part of the screen.

4. The device according to claim 1, wherein the first support element extends from one side of the screen to the other at the first part of the screen.

5. The device according to claim 1, wherein the first scraper comprises a scraping part intended to be in contact with the particles, the device being configured so that the scraping part can be moved in a direction opposite to the direction of movement of the particle structure on the first part of the screen.

6. The device according to claim 1, wherein the first scraper is a cylinder.

7. The device according to claim 1, wherein the first support element comprises a support cylinder.

8. The device according to claim 1, wherein the support cylinder is configured to be rotated by the screen.

9. The device according to claim 1, further comprising:
a second scraper located on the first side of the screen and configured to scrape the particle structure on a second part of the screen, and
a second support element located on the second side of the screen and configured to support the second part of the screen.

10. The device according to claim 1, comprising a blower configured to expel a gas through the screen into a particle reservoir.

11. The device according to claim 1, further comprising an ejection device configured to eject the particles from the first surface.

12. The device according to claim 11, wherein the ejection device is located on the second side of the screen and is configured to generate a transport fluid flow which only passes through predetermined parts of the first surface of the screen.

13. A three-dimensional printing system comprising at least once the device according to claim 1, and a means of agglomeration.

14. A method for manipulating particles comprising the steps of:
providing a device for manipulating particles, the device comprising:
a screen having a first surface on which a particle structure can form, the first surface being configured to be moved,
a first scraper located on a first side of the screen, at a non-zero distance from the first surface, and configured to scrape the particle structure on a first part of the screen, and
a first support element located on a second side of the screen and configured to support the first part of the screen, the second side of the screen and the first side of the screen being separated by the screen, the first surface being configured to be moved so as to move the particle structure in a direction parallel to the tangent to the first surface;
supplying particles on the first surface,
moving the particles to the first part of the screen, and scraping the particles,
wherein the supply of the particles to the first surface precedes the scraping.

15. A three-dimensional printing method comprising, in this order:
the method according claim 14,
an ejection of the particles from at least parts of the particle structure, and
an agglomeration of said particles.

* * * * *